(12) United States Patent
Zietz

(10) Patent No.: US 9,916,014 B2
(45) Date of Patent: Mar. 13, 2018

(54) DISPLAY MODULE WITH INTEGRATED PROXIMITY SENSOR

(71) Applicant: Continental Automotive Systems, Inc., Auburn Hills, MI (US)

(72) Inventor: Heath D. Zietz, Ortonville, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 279 days.

(21) Appl. No.: 14/250,649

(22) Filed: Apr. 11, 2014

(65) Prior Publication Data
US 2015/0293611 A1    Oct. 15, 2015

(51) Int. Cl.
| G06F 3/03 | (2006.01) |
| B60N 2/00 | (2006.01) |
| G06F 1/16 | (2006.01) |

(52) U.S. Cl.
CPC .......... *G06F 3/0325* (2013.01); *B60N 2/002* (2013.01); *G06F 1/1601* (2013.01)

(58) Field of Classification Search
CPC .... G06F 3/0321; G06F 3/0412; G06F 3/0421; G06F 3/0428; G06F 3/017; G06F 3/042
See application file for complete search history.

(56) References Cited

U.S. PATENT DOCUMENTS

| 7,253,722 B2 | 8/2007 | Deasy et al. |
| 7,581,859 B2 | 9/2009 | Lynam |
| 2009/0284361 A1 | 11/2009 | Boddie et al. |
| 2009/0295760 A1* | 12/2009 | Linge .................... G06F 3/0412 345/179 |
| 2011/0122071 A1* | 5/2011 | Powell .................. G06F 3/0412 345/173 |
| 2012/0050007 A1* | 3/2012 | Forutanpour ......... G06F 3/0233 340/5.8 |
| 2012/0062743 A1 | 3/2012 | Lynam et al. |
| 2013/0135219 A1* | 5/2013 | Yin ....................... G06F 3/0428 345/173 |
| 2013/0181896 A1* | 7/2013 | Gruhlke .................. G06F 3/017 345/156 |
| 2014/0218340 A1* | 8/2014 | Rai ........................ G06F 3/017 345/175 |
| 2015/0084928 A1* | 3/2015 | Wyrwas ................ G06F 3/0421 345/175 |
| 2015/0103051 A1* | 4/2015 | Wyrwas ................ G06F 3/0416 345/175 |

FOREIGN PATENT DOCUMENTS

| CN | 101803458 A | 8/2010 |
| CN | 102293057 A | 12/2011 |
| CN | 103270436 A | 8/2013 |
| WO | 9525322 | 11/1995 |

OTHER PUBLICATIONS

English Translation of abstract of CN102293057A (from espacenet).
English Translation of abstract of CN101803458A (from espacenet).
English Translation of abstract of CN103270436A (from espacenet).

* cited by examiner

*Primary Examiner* — Gerald Johnson

(57) ABSTRACT

A display module includes an electronic display screen and a sensor operable to detect radiation reflected to a surface of the electronic display screen. A method of detecting an object is also disclosed.

13 Claims, 4 Drawing Sheets

DISPLAY MODULE WITH INTEGRATED PROXIMITY SENSOR

BACKGROUND

The present disclosure relates to display modules, more particularly, to a display module with proximity sensing.

Modern vehicles typically include numerous displays in the vehicle interior such as on the instrument cluster, for example, that communicate information to an occupant. Displays can include an electronic display screen that provides content to the driver or passenger in the form of one or more graphics, such as one or more a vehicle conditions or media. These displays may update the content based upon the proximity of the occupant to the display.

Some displays, commonly known as "multiple quadrant systems," utilize several sensors to determine the proximity of the occupant to the display and to achieve proper resolution. These sensors are separate and distinct from the display, and are often located a distance from the display. However, having the sensor spaced from the display can introduce error into the computation of the location of the occupant with respect to the display.

SUMMARY

A disclosed display module includes a panel having an electronic display screen, at least one radiation source operable to emit radiation, and a sensor positioned adjacent to the panel. The sensor is operable to detect radiation reflected to a surface of the panel.

An additional disclosed display module includes a housing, an electronic display screen mounted to the housing, and a sensor operable to detect radiation reflected to a surface of the electronic display screen. The electronic display screen is responsive to radiation being detected by the sensor.

A disclosed method of detecting an object includes providing a panel including an electronic display screen, emitting radiation toward an object, and detecting radiation reflected from the object to a surface of the electronic display screen.

Although the different examples have the specific components shown in the illustrations, embodiments of this disclosure are not limited to those particular combinations. It is possible to use some of the components or features from one of the examples in combination with features or components from another one of the examples.

The various features and advantages of this disclosure will become apparent to those skilled in the art from the following detailed description. The drawings that accompany the detailed description can be briefly described as follows.

DETAILED DESCRIPTION

Figure 1:
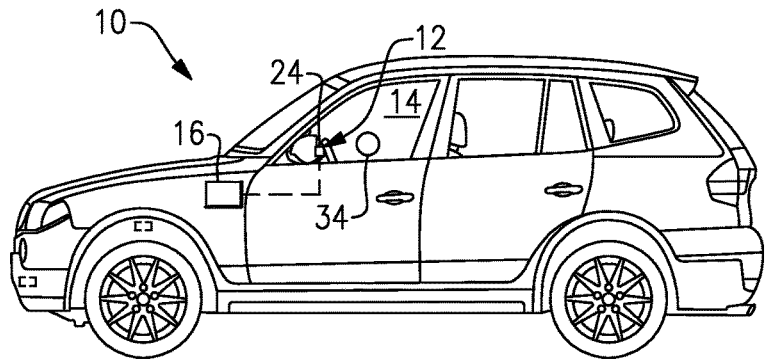
FIG. 1 schematically illustrates a vehicle including a display module.

FIG. 1 schematically illustrates a vehicle 10 that can include a display module 12 for providing content to an occupant. In this disclosure, like reference numerals designate like elements where appropriate and reference numerals with the addition of one-hundred or multiples thereof designate modified elements that are understood to incorporate the same features and benefits of the corresponding original elements. The display module 12 can be positioned, for example, within a passenger cabin 14 of the vehicle 10.

The display module 12 is operable to display content to the user or occupant in the form of one or more graphics. For instance, the content can include one or more conditions of the vehicle, such as fuel level or velocity. In other examples, the display module 12 is a multimedia device operable to display content in the form of navigational data, imagery or radio data, or can also provide an interface to other digital systems onboard the vehicle 12. The display module 12 can be in electrical communication with another system, such as a vehicle control 16 operable to perform various system tasks. Other systems may benefit from the teachings herein, including ground-based systems, aircraft systems, handheld mobile devices and other computing devices. In yet other examples, the display module 12 is a stand-alone system.

Figure 2:
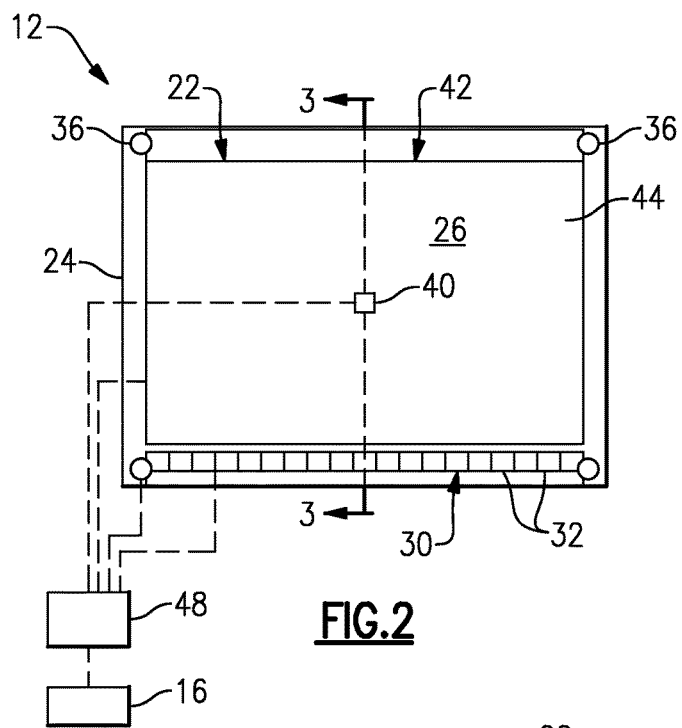
FIG. 2 schematically illustrates an exemplary display module.
Figure 3:
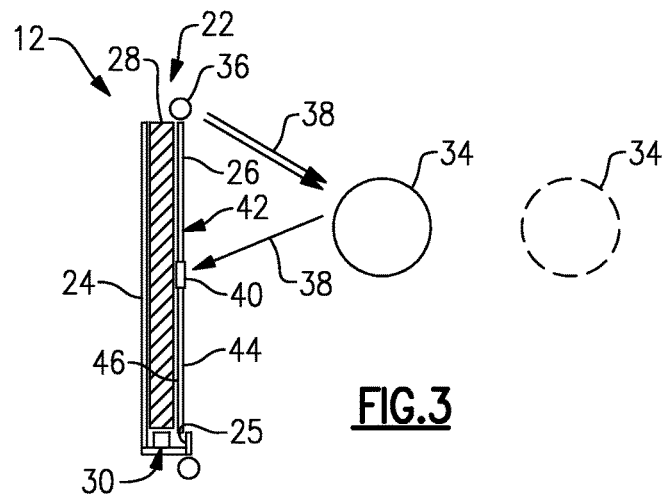
FIG. 3 is a schematic cross-section view of the display module of FIG. 2.

FIGS. 2 and 3 schematically illustrate an exemplary display module 12 with a sensor integrated into the display module 12 for proximity sensing. The display module 12 includes a panel 22 and a housing 24 for mounting the panel 22 thereto. The housing 24 can define a chamber 25 for receiving a portion of the panel 22.

The panel 22 includes an electronic display screen 26 for displaying content to the user or occupant of the vehicle 10. In some examples, the electronic display screen 26 is a thin film transistor (TFT) display, such as a liquid crystal display (LCD). The panel 22 can include a light guide or enhancer 28 (shown in FIG. 3) positioned adjacent to the electronic display screen 26 for illuminating the electronic display screen 26, as is known in the art. The light guide 28 can be made of an acrylic, an acrylic composite, or another suitable material. A conventional backlighting device 30 can be provided, such as at a perimeter of the light guide 28, to illuminate the light guide 28. The backlighting device 30 can include one or more light emitting diodes (LEDs) 32, bulbs or another conventional device to provide illumination. In other examples, the electronic display screen 26 is an organic light-emitting diode (OLED) display. Of course, other suitable display screens may be utilized or modified in view of the teachings herein.

The display module 12 is operable to detect a proximity of an object 34 with respect to the panel 22, and more preferably, to the electronic display screen 26. The object 34 may be an appendage of the occupant, such as a hand, finger torso or another portion of the occupant's person. As discussed in detail below, the display module 12 is operable to update the content of the electronic display screen 26 in response to detecting the proximity of the object 34. For instance, the display module 12 may be operable to display a first content to an occupant of the vehicle 10 when the occupant is located at a first position relative to the electronic display screen 26, and operable to display a second, different content when the occupant is located at a second position. The first content could be navigational data, and the second content could be a menu, for example, for interacting with another system or feature of the display module 12 when the occupant is in relatively close proximity to the electronic display screen 26. The content can also be based upon the proximity of the object 34 with respect to a region of the electronic display screen 26. It should be appreciated that the content and its arrangement can be determined based upon design parameters defined by the skilled artisan.

The display module 12 includes at least one radiation source 36 positioned adjacent to, and preferably, in close proximity to, the panel 22, and more particularly, to the electronic display screen 26. The radiation source 36 is operable to emit radiation 38 towards the object 34. In some examples, the radiation source 36 is an LED operable to emit infrared radiation. In further examples, the radiation source 36 includes four LEDs positioned about a perimeter of the panel 22. Locating the radiation source 36 in close proximity to the electronic display screen 26 can improve the overall deflection of the radiation 38 off the object 34, thereby improving resolution of the display module 12. However, other radiation sources, frequencies or ranges of frequencies or spectrums, quantities and arrangements are contemplated.

The display module 12 includes at least one sensor 40 operable to detect radiation, and for example, infrared radiation. The sensor 40 is positioned with respect to the panel 22 to be operable to detect radiation communicated to a surface 42 of the panel 22, including radiation 38 reflected from the object 34. In some examples, the sensor 40 is positioned with respect to a forward face 44 of the electronic display screen 26 to detect radiation 38 communicated to the forward face 44. In other examples, the display module 12 is a multiple quadrant system including two or more sensors 40 to determine the spatial location of the object 34 as the object moves relative to the display module 12. In one example, four sensors 40 are positioned at the corners of the housing 24 (shown in FIG. 2). The sensor 40 can be positioned inside a region projecting from, or defined by, a perimeter of the panel 22 or the electronic display screen 26. In further examples, the sensor 40 is centered on the panel 22 or the electronic display screen 26. In other examples, the sensor 40 is positioned a distance from the center of the panel 22 or the electronic display screen 26 and within the perimeter of either the panel 22 or the electronic display screen 26. However, other locations of the sensor 40 are contemplated.

Figure 3A:
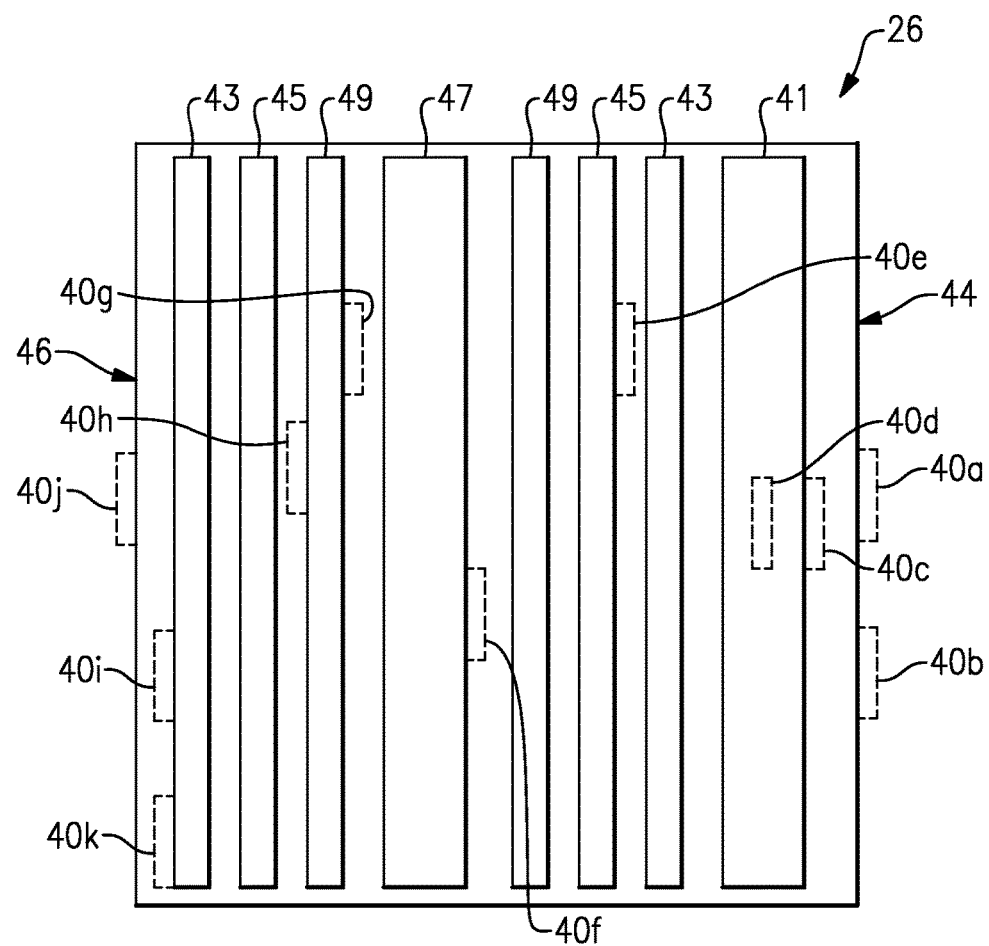
FIG. 3A is a schematic exploded side view of an electronic display screen of the display module of FIG. 3.

Referring to FIG. 3, the sensor 40 can be integrated into a portion of the electronic display screen 26. As seen in FIG. 3A, which illustrates a highly schematic view of an electronic display screen, such as the electronic display screen 26 shown in FIG. 3, the electronic display screen 26 is comprised of several layers. The layers of the electronic display screen 26 can include a display glass or composite 41, one or more layers of polarizing films 43 and filters 45, a liquid crystal layer 47, and a pair of electrodes 49, for example. In some examples, the electronic display screen 26 includes at least one filter 45 operable to selectively transmit or filter radiation 38 emitted from the radiation source 36 and/or reflected from the object 34. In further examples, at least one filter 45 is an IR filter operable to selectively transmit or filter radiation in the infrared spectrum. It should be appreciated that the electronic display screen 26 can include fewer or more layers of the same or different materials. In some examples, the electronic display screen 26 is fabricated using a low temperature polysilicon (LTPS) process. However, the electronic display screen 26 can be fabricated using another technique known in the art.

The sensor 40, or any number of sensors, can positioned at various positioned shown by way of example in dashed line as sensors 40*a*-40*k*. In some examples, the sensor 40 is positioned onto a surface of the display glass, and for instance, in the center of the forward face 44 of the electronic display screen 26. In other examples, the sensor 40 is positioned between, or integrated within, one of the layers of the electronic display screen 26. In yet other examples, the sensor 40 is positioned onto, or in close proximity to, a rear face 46 surface of the electronic display screen 26. However, other positions, quantities and arrangements of the sensor 40 with respect to the electric display screen 26 are contemplated. Integrating the sensor 40 with the electronic display screen 26 can improve the accuracy of calculating the location and proximity of the object 34 by being able to receive radiation 38 at stronger relative amplitudes and by reducing a distance between the object 34 and the sensor 40 as compared to the placement of sensor(s) of prior systems.

The display module 12 can include a controller 48 (shown schematically) electrically coupled to each sensor 40 and radiation source 36. The controller 48 can be located in, attached to, or formed in the housing 24. In other examples, the controller 48 can be located remotely from the housing 24. In some examples, the controller 48 is electrically coupled to the vehicle control 16 or another system, which is operable to update or provide content to the electronic display screen 26, such as navigational data, radio data and a vehicle condition, such as fuel levels and the like. In other examples, the controller 48 provides this functionality. The functionality of the controller 48 can also be incorporated into the vehicle control 16 or another system.

The controller 48 is operable to command each radiation source 36 to emit radiation towards the object 34. The controller 48 is also operable to receive data from the sensor 40 in response to the sensor 40 detecting radiation, such as radiation reflected from the object 34. In some examples, the controller 48 is also electrically coupled to the backlighting device 30 to adjust the amount of illumination provided to the light guide 28.

Figure 4:
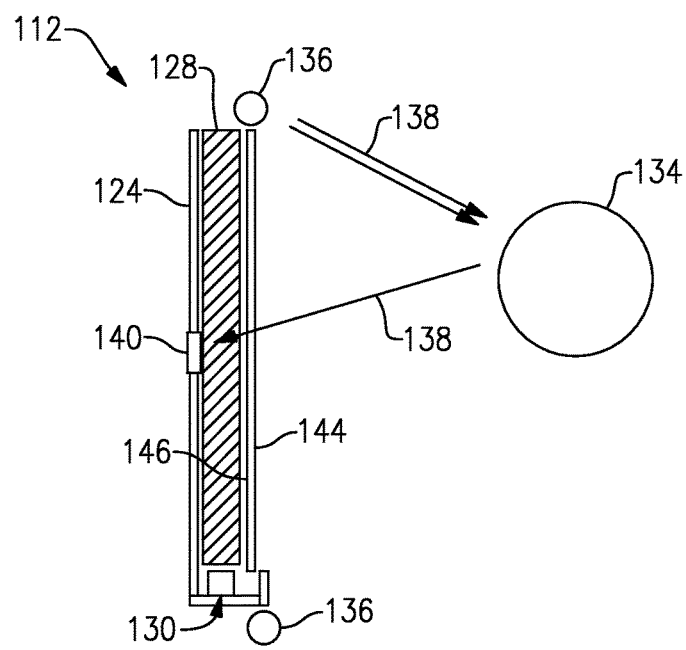
FIG. 4 is a schematic cross-section view of a second embodiment of a display module.

FIG. 4 illustrates a schematic cross-section view of a second exemplary display module 112. In this example, a sensor 140 is located in, attached to, or formed in a chamber 125 of a housing 124 and is positioned behind an electronic display screen 126 relative to the user or occupant. The display module 112 can include a light guide 128 positioned at a rear face 146 of the electronic display screen 126, such that the light guide 128 is arranged between the electronic display screen 126 and the sensor 140. The light guide 128 is configured to illuminate the electronic display screen 126, and to also communicate radiation 138 to the sensor 140, which is reflected from the object 134 to the electronic display screen 126. Placement of the sensor 140 improves accuracy of detecting the proximity of the object 134, and also reduces integration cost over prior systems.

Figure 5:
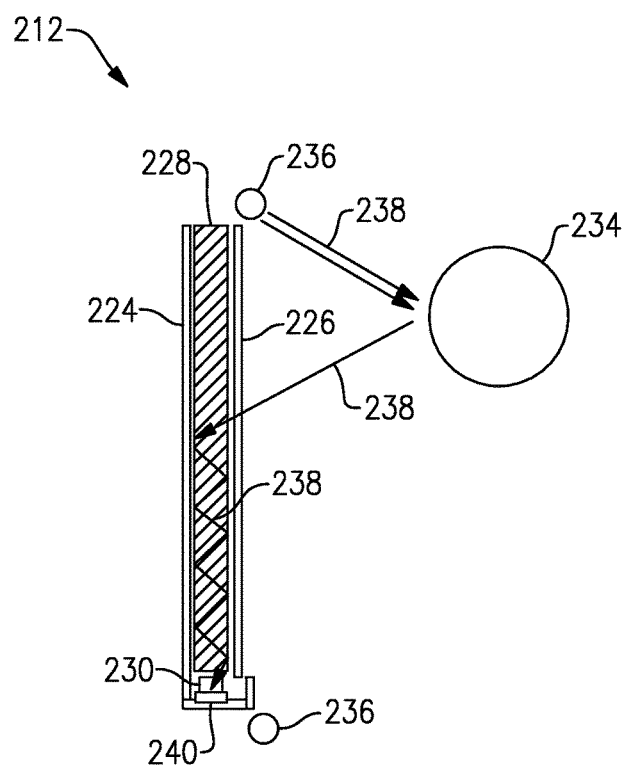
FIG. 5 is a schematic cross-section view of a third embodiment of a display module.

FIG. 5 illustrates a schematic cross-section view of a third exemplary display module 212. A sensor 240 is positioned at a perimeter of a light guide 228 within a housing 224. In some examples, the sensor 240 is arranged adjacent to a backlighting device 230 which is also positioned at the perimeter of the light guide 228. The radiation source 236 is configured to emit radiation 238 to the object 234. The object 234 reflects the radiation 238 back toward the display module 212, which is then communicated through the electronic display screen 226 and to the light guide 228. The light guide 228 is configured to communicate the radiation 238 to the sensor 240. In some examples, the light guide 228 is optimized not only to communicate light provided by the backlighting device 230 through the light guide 228, but also to communicate the radiation 238 through the light guide 228 and onto the sensor 240 using techniques known in the art.

Figure 6:
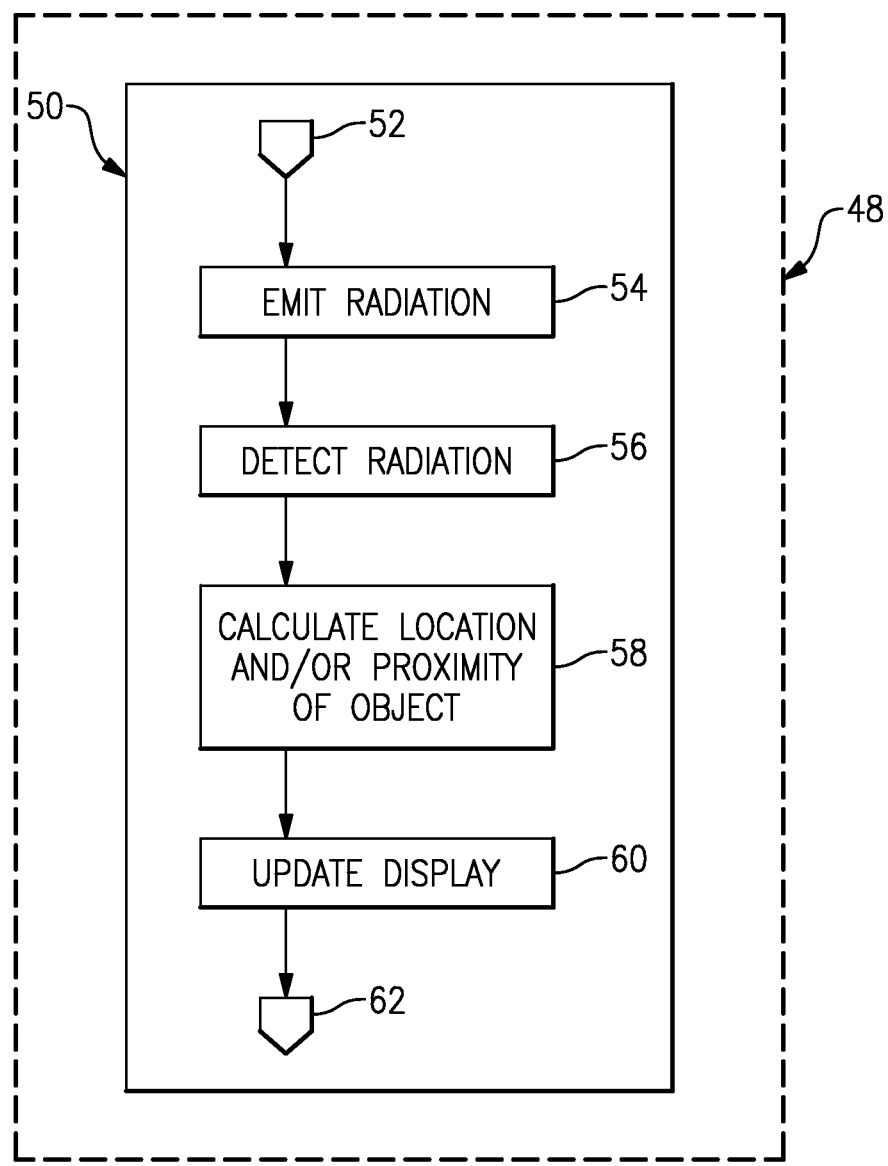
FIG. 6 is a flowchart of a proximity detection algorithm.

With reference to FIG. 6, operation of a display module 12, 112, 212 may be performed through a proximity detection algorithm 50 which controls, for example, the emitting of radiation 38 by a radiation source 36, and also receiving data from a sensor 40 in response to the sensor 40 detecting radiation 38. The functions of the proximity detection algorithm 50 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment such as a controller 48, or a combination thereof.

In the illustrative example, the proximity detection algorithm 50 controls functions 52-62. Upon initiation of the display module 12 at step 52, a controller 48 commands a radiation source 36 to emit radiation 38 towards an object 34 at step 54. The object 34 reflects the radiation 38 onto a surface 42 of the display module 12, and more particularly onto an electronic display screen 26. In some examples, the radiation 38 is communicated through the electronic display screen 26 and/or through a light guide 28. At step 56 a sensor 40 detects the radiation 38 and provides data to the controller 48 corresponding to a spatial position of the object 34.

At step 58, the controller 48 or another device calculates the proximity of, and in some examples the location of, the object 34 with respect to the panel 22 or electronic display screen 26. The calculations can be performed based on known techniques, utilizing various graphics libraries such as OpenGL. In some examples, where the display modules 12 is a multiple quadrant systems, the steps of emitting 54 and detecting 56 are repeated in sequence at least two, and more preferably at least four times, to determine the proximity of the object 34 to the panel 22 or electronic display screen 26. However, the steps of emitting 54 and detecting 56 can be repeated any number of times based upon system requirements. At step 60 a system providing content to the electronic display screen 26 is commanded to update the content in response to the radiation 38 being detected by the sensor 40. Thereafter, steps 54-60 are repeated until the display module 12 is powered down or placed in standby at step 62.

The controller 48 typically includes a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the proximity detection algorithm 50 for operation of the display module 12, 112, 212 as described herein. The interface facilitates communication with the other systems or components of the vehicle 10. In some examples, the controller 48 may be a portion of the vehicle control 16, another system, or a stand-alone system.

The display module 12, 112, 212 disclosed herein provides many benefits. For instance, positioning each sensor 40 in close proximity to, or integrating each sensor 40 into, the panel 22 or electronic display screen 26 can improve the resolution or accuracy of determining the location or proximity of the object 34 relative to the panel 22 or electronic display screen 26. Positioning the sensor 40 according to the teachings of the present disclosure can also reduce the quantity of sensors for multiple quadrant systems, while still achieving proper resolution. Another benefit of integrating the sensor 40 into the display module 12 reduces layout and mechanical effort. Also, the display module 12, 112, 212 requires less electronic componentry, thereby reducing cost and improving accuracy due to signal, system and/or computational error.

Although the different examples have a specific component shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A display module comprising:
a substantially rectangular panel having a front side and an opposing rear side, the panel comprising first and second layers, the first layer comprising:
a substantially planar and substantially rectangular electronic display screen coupled to the second layer, the electronic display screen comprising at least one of: a thin film transistor display and a liquid crystal display;
the second layer comprising:
a substantially planar and substantially rectangular light guide;
a radiation source configured to emit radiation in a direction that is away from the panel;
a radiation sensor positioned between the first and second layers, the radiation sensor being operable to detect radiation emitted from the radiation source and which is reflected from an object, back toward the panel;
wherein the panel additionally includes a light guide operable to illuminate the electronic display screen; and
a controller operable to cause the electronic display screen to display content in response to determining a proximity of the object relative to the panel;
wherein:
the controller is configured to cause the electronic display screen to display a first content in response to determining the object is located at a first distance relative to the electronic display screen, and cause the electronic to display a second, different content in response to determining the object is located at a second, different distance relative to the electronic display screen, the electronic display screen displaying information for both the first and second contents.

2. The display module as recited in claim 1, wherein the radiation source is a light emitting diode operable to emit infrared radiation, and the radiation sensor is operable to detect infrared radiation.

3. The display module as recited in claim 2, wherein the at least one radiation source includes four light emitting diodes positioned about a perimeter of the panel.

4. The display module as recited in claim 1, wherein the light guide is arranged between the electronic display screen and the radiation sensor.

5. The display module as recited in claim 1, wherein the radiation sensor is positioned at a perimeter of the light guide.

6. The display module as recited in claim 5, wherein the radiation sensor is arranged adjacent to a backlighting device positioned at the perimeter of the light guide.

7. The display module as recited in claim 1, wherein the light guide is positioned adjacent to a rear face of the electronic display screen opposite the forward face.

8. The display module as recited in claim 1, wherein the radiation sensor is integrated into a layer of the electronic display screen.

9. The display module as recited in claim 1, wherein the radiation sensor is positioned onto a layer within the electronic display screen.

10. The display module as recited in claim 1, comprising a housing configured to mount the panel and to receive the radiation sensor within a chamber defined by the housing.

11. The display module as recited in claim 1, wherein the controller is electrically coupled to the radiation source and the radiation sensor.

12. The display module as recited in claim 1, wherein the radiation sensor is positioned within a region defined by a perimeter of the panel.

13. The display module as recited in claim 12, wherein the radiation sensor is centered on the electronic display screen.

* * * * *